United States Patent
Tye

(10) Patent No.: US 9,683,125 B2
(45) Date of Patent: Jun. 20, 2017

(54) ONE-COMPONENT, CURABLE COATING COMPOSITIONS, PROCESSES FOR MAKING AND USING THEM, AND COATINGS AND ARTICLES PREPARED WITH THEM

(71) Applicant: BASF Coatings GmbH, Münster (DE)

(72) Inventor: Anthony J. Tye, Waterville, OH (US)

(73) Assignee: BASF Coatings GmbH, Münster (DE)

( * ) Notice: Subject to any disclaimer, the term of this patent is extended or adjusted under 35 U.S.C. 154(b) by 0 days.

(21) Appl. No.: 14/758,863

(22) PCT Filed: Nov. 29, 2013

(86) PCT No.: PCT/EP2013/075104
§ 371 (c)(1),
(2) Date: Jul. 1, 2015

(87) PCT Pub. No.: WO2014/106552
PCT Pub. Date: Jul. 10, 2014

(65) Prior Publication Data
US 2015/0337159 A1    Nov. 26, 2015

Related U.S. Application Data

(60) Provisional application No. 61/748,604, filed on Jan. 3, 2013.

(51) Int. Cl.
| | | |
|---|---|---|
| C09D 143/04 | (2006.01) | |
| C09D 133/12 | (2006.01) | |
| C08K 5/5419 | (2006.01) | |
| C08K 5/1515 | (2006.01) | |
| B05D 3/10 | (2006.01) | |
| C08L 43/04 | (2006.01) | |
| C08L 63/10 | (2006.01) | |

(52) U.S. Cl.
CPC .......... *C09D 133/12* (2013.01); *B05D 3/108* (2013.01); *C08K 5/1515* (2013.01); *C08K 5/5419* (2013.01); *C09D 143/04* (2013.01); *C08L 43/04* (2013.01); *C08L 63/10* (2013.01); *C08L 2666/52* (2013.01)

(58) Field of Classification Search
None
See application file for complete search history.

(56) References Cited

U.S. PATENT DOCUMENTS

| | | |
|---|---|---|
| 2,846,408 A | 8/1958 | Franzkarl et al. |
| 5,408,001 A | 4/1995 | Nakahata et al. |
| 6,403,699 B1 | 6/2002 | Rockrath et al. |
| 8,865,851 B2 | 10/2014 | Hoffmann et al. |

FOREIGN PATENT DOCUMENTS

| | | | |
|---|---|---|---|
| CA | 1290089 | 10/1991 | |
| EP | 0008127 | 2/1980 | |
| EP | 0159715 | 10/1985 | |
| EP | 0159716 | 10/1985 | |
| EP | 0249201 | 12/1987 | |
| EP | 0276501 | 8/1998 | |
| WO | WO-88/02010 | 3/1988 | |
| WO | WO-94/22968 | 10/1994 | |
| WO | WO-97/12945 | 4/1997 | |
| WO | WO-2004/058907 | 7/2004 | |
| WO | WO 2004058907 A1 * | 7/2004 | ......... C08G 18/4277 |
| WO | WO-2010/112106 | 10/2010 | |

OTHER PUBLICATIONS

"Functional group". IUPAC. Compendium of Chemical Terminology, 2nd ed. (the "Gold Book"). Compiled by A. D. McNaught and A. Wilkinson. Blackwell Scientific Publications, Oxford (1997).*
"Functionality". IUPAC. Compendium of Chemical Terminology, 2nd ed. (the "Gold Book"). Compiled by A. D. McNaught and A. Wilkinson. Blackwell Scientific Publications, Oxford (1997).*
PCT International Search Report in PCT/EP2013/075104, mailed Feb. 3, 2014, 3 pages.
PCT International Written Opinion in PCT/EP2013/075104, mailed Feb. 3, 2014, 4 pages.
PCT International Preliminary Report on Patentability on PCT/EP2013/075104, dated Jul. 7, 2015, 6 pages.

* cited by examiner

*Primary Examiner* — Richard A Huhn
(74) *Attorney, Agent, or Firm* — Servilla Whitney LLC

(57) ABSTRACT

Described are one-component, curable coating compositions that include (a) a polymer having a plurality of alkoxysilane groups; (b) a polyepoxide having a plurality of epoxide groups connected to a compound, oligomer, or polymer through ester linkages, ether linkages, or a combination of ester linkages and ether linkages; (c) a chelated metal alkoxide, in which the metal is aluminum, titanium, or zirconium, or a mixture of such chelated metal alkoxides; and (d) a monofunctional di- or trialkoxysilane compound, which may be volatile, with the proviso that the coating compositions are free of, or essentially free of, polymers with hydroxyl groups, primary amine groups, and secondary amine groups (i.e., amine groups with at least one active hydrogen, >N—H). These one-component, curable coating compositions do not require any additional ingredients to be mixed in before application, are storage stable with do not build viscosity during use (in other words, in use the pot-life is not shortened by crosslinking of internal components) so that excess material can be reused, yet the coating composition provides ambient cure when applied in a coating layer and exposed to moisture (i.e., atmospheric water vapor).

15 Claims, No Drawings

ONE-COMPONENT, CURABLE COATING COMPOSITIONS, PROCESSES FOR MAKING AND USING THEM, AND COATINGS AND ARTICLES PREPARED WITH THEM

CROSS-REFERENCE TO RELATED APPLICATIONS

This is application is the National Stage Entry of PCT/EP2013/075104, filed Nov. 29, 2013, which claims priority to U.S. Provisional Application Ser. No. 61/748,604, filed Jan. 3, 2013, the disclosures of which are incorporate herein by reference in their entireties.

TECHNICAL FIELD

The present invention relates to moisture-curable coating compositions, particularly automotive refinish compositions, to methods for using such compositions, to refinish coatings on a substrate, and to articles such as automotive vehicles with refinish coatings on them.

BACKGROUND

Coating compositions comprising binders having alkoxysilane groups have been known for a long time. In the presence of atmospheric moisture, the alkoxysilane groups of the binders are capable even at room temperature of undergoing condensation with elimination of the alkoxy groups to form Si—O—Si bridges. Coating compositions of this kind are suitable, for example, for producing automotive refinishes. In that context, they have a critical advantage over the more often used isocyanate-based coating compositions in that they are significantly less objectionable from a toxicological standpoint, permitting their application largely without the extensive precautionary measures that are necessary with isocyanate-based coating systems.

Hoffmann et al., WO 2010/112106, incorporated herein by reference, discloses moisture curing coating compositions based on aprotic solvents comprising (A) at least one binder having alkoxysilane groups and (B) at least one phosphorous- and nitrogen-containing crosslinking catalyst. The binder (A) is combined with organic solvent and other desired coating ingredients, and the catalyst (B) is admixed into this coating material just before use. The binder comprises at least one polyacrylate and/or polymethacrylate which is obtainable using one or more ethylenically unsaturated monomers (a1) of the formula (I)

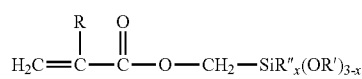
(I)

in which R is H or methyl, R' is H, alkyl, or cycloalkyl, R'' is alkyl, cycloalkyl, aryl, or aralkyl, and x=0 to 2. The coating compositions of WO 2010/112106 exhibit rapid curing in the presence of moisture to be tack-free after curing at 60° C. for just 30 minutes and also have a potlife of at least 30 minutes, specifically of at least 2 hours. WO 2010/112106 also discloses that at least proportional use of acrylate- and/or methacrylate-functional alkoxysilanes with ethoxy groups instead of methoxy groups to prepare the binders provides coating compositions that, on curing, release very little methanol and that, nevertheless, exhibit the requisite rapid curing.

Typically, the reactive components of an ambient-cured, thermosetting coating are kept segregated until just prior to application, as is the case with the WO 2010/112106 coating composition. Once all of the components are combined (as when the catalyst (B) is admixed with the coating material containing the binder (A) in making the WO 2010/112106 coating composition) the crosslinking reaction proceeds, increasing viscosity until the viscosity reaches a point where the coating composition can no longer be applied. Any unused material at that point must be discarded. This span of time between combining all of the components and when the viscosity becomes too high for proper application is termed the "pot-life" of the coating composition. It has long been accepted that compositions that are sufficiently reactive to cure at ambient temperatures or in low-temperature ovens (e.g., at 60° C.) to be tack-free after a reasonable time interval (e.g., in an hour) must be formulated as two-component or multi-component coatings in which one or more ingredients are segregated from the remaining coating material until just prior to use. In contrast, one-component curable coating compositions in which all ingredients are combined in a storage-stable package have required high heat or other high energy input, such as actinic radiation, to bring about cure of applied coating layers in a reasonable period of time.

Nakahata et al., U.S. Pat. No. 5,408,001 discloses a three-component resin composition comprising a hydroxyl group-containing compound containing fluorine, an epoxy group-containing compound, and a silanol or hydrolyzable silane group-containing compound. The Nakahata patent also discloses two component resin compositions in which one component has one kind of the groups and the second component has both of the other two kinds of groups. A metal chelate compound is used as a curing catalyst. The composition is reported to be storage stable and capable of curing at room temperature in 8 hours to 7 days or heated to 40° to 100° C. in 5 minutes to 3 hours.

SUMMARY

One or more embodiments are directed to one-component, curable coating compositions that include (a) a polymer having a plurality of alkoxysilane groups; (b) a polyepoxide having a plurality of epoxide groups connected to a compound, an oligomer, or a polymer through ester linkages, ether linkages, or a combination of ester linkages and ether linkages; (c) a chelated metal alkoxide, in which the metal is aluminum, titanium, or zirconium, or a mixture of such chelated metal alkoxides; and (d) a monofunctional di- or trialkoxysilane compound, which may be volatile (capable of evaporating from the film at ambient temperatures and atmospheric pressures), with the proviso that the coating compositions are free of, or essentially free of, polymers or other components with hydroxyl groups, primary amine groups, or secondary amine groups (i.e., amine groups with at least one active hydrogen, >N—H). A volatile monofunctional di- or trialkoxysilane compound is one that is measured as a part of the volatile organic content according to the standard method ASTM D3960. As used herein, the term "compound" has no repeating monomer units while "oligomer" and "polymer" are used in the usual sense to refer to molecules that have repeating monomer units regardless of the presence of one or more reactive groups that can undergo further reaction (e.g., crosslinking).

In one or more embodiments, the one-component, curable coating compositions do not require any additional ingredients to be mixed in before application, are storage stable, and do not build viscosity during use. In other words, in use, the pot-life is not shortened by crosslinking of components, so that excess material can be reused. Yet the coating composition provides ambient cure when applied in a coating layer and exposed to moisture (i.e., atmospheric water vapor).

In addition, in one or more embodiments, the coating compositions have very long shelf stability (one to two years shelf stability may be expected), excellent adhesion, excellent application properties, good gloss, good chemical resistance, and good durability. Coating properties are comparable to coating obtained using conventional two-component coatings that have a very short pot life and must be disposed of if not used soon after mixing, while the compositions of one or more embodiments can be used without a problem of viscosity increase and crosslinking of components before application, allowing return of any unused portion back to the can for future use.

Embodiments of a second aspect of the invention are directed to a method of refinishing a substrate. In one or more embodiments, a method of refinishing a substrate, particularly an automotive vehicle or a component of an automotive vehicle (e.g., a hood, decklid, door, or panel), includes applying the one-component, curable coating composition to all of a surface or to an area that is less than all of the surface of the substrate and curing the applied composition mixture with moisture to form a cured coating layer from the applied coating composition. Also provided is the cured coating and the article having on it the cured coating.

"A," "an," "the," "at least one," and "one or more" are used interchangeably to indicate that at least one of the item is present; a plurality of such items may be present unless the context clearly indicates otherwise. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The terms "comprises," "comprising," "including," and "having," are inclusive and do not preclude the presence or addition of other features.

In this description, "polymer" may be used to include both oligomeric and polymeric materials; "compound" refers to materials that are not oligomers or polymers and have no repeating monomer units. "Acrylic polymer" refers to any polymer or copolymer prepared using a (meth)acrylate monomer or mixture of (meth)acrylate monomers. "(Meth)acrylic" refers to either or both of "acrylic" and "methacrylic"; "(meth)acrylate" refers to either or both of "acrylate" and "methacrylate." Thus, butyl(meth)acrylate refers to butyl acrylate, butyl methacrylate, or both butyl acrylate and butyl methacrylate.

DETAILED DESCRIPTION

In one or more embodiments, the one-component, curable coating compositions include a polymer having a plurality of alkoxysilane groups, which may be selected from alkoxysilane-functional acrylic polymers, polyurethanes, and polyesters.

An alkoxysilane-functional acrylic polymer may be prepared by polymerization of one or more alkoxysilane-functional acrylate and/or methacrylate monomers, optionally but specifically along with one or more ethylenically unsaturated comonomers. Suitable alkoxysilane-functional acrylate and/or methacrylate monomers include those of formula (I)

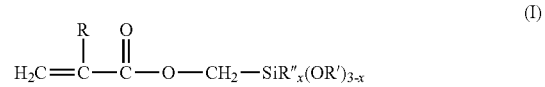

in which
R=hydrogen or methyl radical,
R'=hydrogen, alkyl or cycloalkyl, specifically R'=alkyl radical, in particular having one to four atoms, especially each R' independently is ethyl or methyl,
R''=alkyl, cycloalkyl, aryl or aralkyl, it being possible for the carbon chain to be interrupted by nonadjacent oxygen groups, sulfur groups or groups $NR_a$, with $R_a$=alkyl, cycloalkyl, aryl or aralkyl, specifically R''=alkyl radical, in particular having one to six carbon atoms, and
x=an integer of 0 to 2, in particular x=0 or 1, and more particularly x=0.

Examples of ethylenically unsaturated monomers of the formula (I) are alpha-methacryloyloxymethylmethoxydimethylsilane, alpha-methacryloxymethyldimethoxymethylsilane, alpha-methacryloyloxymethyltrimethoxysilane, alpha-methacryloyloxymethylethoxydimethylsilane, alpha-methacryloyloxymethyldiethoxymethylsilane, alpha-methacryloyloxymethyltriethoxysilane, alpha-methacryloyloxymethyltriisopropoxysilane, alpha-methacryloyloxymethyldiisopropoxymethylsilane, alpha-methacryloyloxymethylisopropoxydimethylsilane, alpha-methacryloyloxymethyltris(2-methoxyethoxy) silane, alpha-methacryloyloxymethylbis(2-methoxyethoxy)methylsilane, alpha-methacryloyloxymethyltripropoxysilane, alpha-methacryloxymethyldipropoxymethylsilane, alpha-methacryloyloxymethylpropoxydimethylsilane, alpha-methacryloyloxymethyl(2-methoxyethoxy)dimethylsilane, alpha-acryloyloxymethylmethoxydimethylsilane, alpha-acryloyloxymethyldimethoxymethylsilane, alpha-acryloyloxymethyltrimethoxysilane, alpha-acryloyloxymethylethoxydimethylsilane, alpha-acryloyloxymethyldiethoxymethylsilane, alpha-acryloyloxymethyltriethoxysilane, alpha-acryloyloxymethyltriisopropoxysilane, alpha-acryloyloxymethyldiisopropoxymethylsilane, alpha-acryloyloxymethylisopropoxydimethylsilane, alpha-acryloyloxymethyltris(2-methoxyethoxy) silane, alpha-acryloyloxymethyltripropoxysilane, alpha-acryloyloxymethyldipropoxymethylsilane, alpha-acryloyloxymethylbis(2-methoxyethoxy)methylsilane, alpha-acryloyloxymethylpropoxydimethylsilane, and alpha-acryloyloxymethyl(2-methoxyethoxy)dimethylsilane. These alpha-silanes may be used individually or else in the form of mixtures of two or more alpha-silanes for preparing the polymers having alkoxysilane groups.

In various embodiments the polymers contain ethoxysilyl groups. Polymers containing ethoxysilyl groups have the advantage that their curing releases the less toxicologically objectionable ethanol, and not the toxicologically objectionable methanol. Thus, in this respect it is an advantage for the acrylic polymer to be prepared using one or more ethylenically unsaturated monomers of the formula (II)

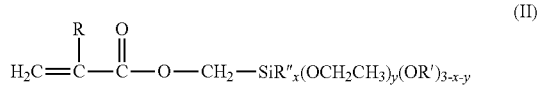

(II)

in which R, R', and R" have the definitions indicated above, x is an integer of from 0 to 2, specifically x=0 to 1, and more specifically x=0,
y is an integer from 1 to 3, specifically y=2 to 3, and $1 \leq x+y \leq 3$, specifically $2 \leq x+y \leq 3$ Nonlimiting examples of ethylenically unsaturated monomers of the formula (II) include alpha-methacryloyloxymethylethoxydimethylsilane, alpha-methacryloyloxymethyldiethoxymethylsilane, alpha-methacryloyloxymethyltriethoxysilane, alpha-acryloyloxymethylethoxydimethylsilane, alpha-acryloyloxymethyldiethoxymethylsilane, and alpha-acryloyloxymethyltriethoxysilane. In particular embodiments the acrylic polymer is prepared using alpha-methacryloylmethyldiethoxymethylsilane, alpha-methacryloyloxymethyltriethoxysilane, alpha-acryloyloxymethyldiethoxymethylsilane, alpha-acryloyloxymethyltriethoxysilane, or a combination of two or more of these monomers.

Acrylic polymers having a plurality of alkoxysilane groups may be prepared, where appropriate, by polymerizing one or more further ethylenically unsaturated monomers as comonomers together with the unsaturated monomer or monomers of the formula (I), the unsaturated monomer or monomers of the formula (II), or with a combination of at least one monomer of formula (I) and at least one monomer of formula (II). The ethylenically unsaturated comonomers employed may be any ethylenically unsaturated monomers that are customarily used, but excluding ethylenically unsaturated monomers with hydroxyl groups, amine groups with active hydrogen, and other such active hydrogen groups. In various embodiments, one or more comonomers may be selected from alkyl esters of ethylenically unsaturated carboxylic acids, vinylaromatic compounds, ethylenically unsaturated monomers having at least two polymerizable, ethylenically unsaturated double bonds, and further ethylenically unsaturated compounds different from these.

Particularly suitable comonomers are alkyl esters of ethylenically unsaturated carboxylic acids without active hydrogen, such as alkyl esters of saturated monoalcohols with ethylenically unsaturated carboxylic acids. Nonlimiting examples of such alkyl esters of ethylenically unsaturated carboxylic acids are alkyl esters and cycloalkyl esters of acrylic, methacrylic, fumaric, crotonic, and maleic acid, such as methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate, lauryl methacrylate, cycloalkyl acrylates and cycloalkyl methacrylates, such as cyclopentyl acrylate, cyclopentyl methacrylate, isobornyl acrylate, isobornyl methacrylate, cyclohexyl acrylate, and cyclohexyl methacrylate, all of which may be used in any combination.

Suitable vinylaromatic comonomers are those without active hydrogen. Nonlimitng examples of suitable vinylaromatic comonomers are vinylaromatic hydrocarbons such as vinyltoluene, alpha-methylstyrene, and styrene.

Suitable as ethylenically unsaturated comonomers having at least two polymerizable, ethylenically unsaturated double bonds are such compounds without active hydrogen. Nonlimiting examples of suitable ethylenically unsaturated comonomers having at least two polymerizable ethylenically unsaturated double bonds are diesters of saturated dialcohols with ethylenically unsaturated carboxylic acids, such as diesters of saturated dialcohols with acrylic, methacrylic, fumaric, crotonic, and maleic acid such as, for example, hexanediol diacrylate, hexanediol dimethacrylate, glycol diacrylate, glycol dimethacrylate, butanediol diacrylate, butanediol dimethacrylate, trimethylolpropane triacrylate, and trimethylolpropane trimethacrylate. Another useful example is a polycarboxylic acid esterified with an unsaturated alcohol containing a polymerizable double bond. Finally it is also possible to use the reaction product of a polyisocyanate and of an unsaturated alcohol or amine, for instance the reaction product of one mole of hexamethylene diisocyanate and two moles of allyl alcohol, or the reaction product of one mole of isophorone diisocyanate and two moles of hydroxyethyl acrylate.

As further ethylenically unsaturated compounds different from the monomer and comonomer types already mentioned, use may be made of other silicon-free monomers without active hydrogen, such as, for example, nitriles of acrylic or methacrylic acid, vinyl esters, or vinyl ethers. It may be advantageous to use up to 10% by weight, based on the total weight of polymerization reactants, of an ethylenically unsaturated carboxamide as an additional comonomer to allow more rapid absorption of water and crosslinking under the influence of atmospheric moisture, Examples of suitable carboxamides include acrylamide, methylacrylamide, itaconamide, α-ethylacrylamide, crotonamide, fumaramide, and maleamide.

In one or more specific embodiments, the binder (A) having alkoxysilane groups is obtained by polymerization of
(a1) 10% to 50%, or in various embodiments 15% to 40%, or more particularly in certain embodiments 20% to 35% by weight of one or more ethylenically unsaturated monomers (a1) of the formula (I), of the formula (II), or a combination of unsaturated monomers (a1) of the formula (I) and of the formula (II);
(a2) 15% to 85% or 25% to 60% by weight of one or more alkyl esters of ethylenically unsaturated carboxylic acids,
(a3) optionally up to 50% or in various embodiments 10% to 30% by weight of one or more vinylaromatic compounds,
(a4) optionally up to 20% or in various embodiments up to 10% by weight of one or more ethylenically unsaturated monomers having at least two polymerizable, ethylenically unsaturated double bonds, and
(a5) optionally up to 40% or in various embodiments up to 20% by weight of one or more further ethylenically unsaturated compounds different from the monomers (a1) to (a4), the sum of the weight percentages of the monomers (a1) to (a5) making 100% by weight in each case.

The alkoxysilane-functional acrylic polymers are generally copolymers and specifically have number-average molecular weights WI, of between 1000 and 20,000 daltons, more particularly in various embodiments between 1500 and 10,000 daltons, measured in each case by means of gel permeation chromatography (GPC) against a polystyrene standard.

The free-radical polymerization for preparing the acrylic polymers having alkoxysilane groups may be carried out, as a nonlimiting example, in an organic solvent at temperatures of 80-180° C., for example at a temperature in the range of 90-160° C.

Suitable solvents for the free-radical polymerization include nonreactive solvents such as, for example, esters, such as ethyl acetate, propyl acetate, n-butyl acetate, and isobutyl acetate, ether esters such as methoxypropyl acetate and butylglycol acetate, ketones such as acetone, methyl ethyl ketone, methyl isobutyl ketone and cyclohexanone, ethers, aromatic, aliphatic, araliphatic and/or cycloaliphatic hydrocarbons, and also mixtures of these solvents. In certain embodiments, one or more of n-butyl acetate, isobutyl acetate, solvent naphtha, Aromatic 100, and xylene may be used. The free-radical polymerization for preparing the acrylic polymer containing alkoxysilane groups may be carried out so as to result in a solution of the polymer with a solids content of, for example, 40% to 85% by weight.

The polymerization reaction may be performed in the presence of an initiator and, if desired, in the presence of a polymerization regulator (also known as a chain transfer agent) without active OH or NH groups. Suitable initiators include azo initiators, such as, for example, azobisisobutyronitrile. Where there is a low or absent fraction of polyethylenically unsaturated monomer (a4) used, peroxy esters in particular may be used as initiators. Nonlimiting examples of suitable initiators include di-tert-butyl peroxide, di-tert-amyl peroxide, tert-amyl peroxy-2-ethylhexanoate, and tert-butyl peroxy-2-ethylhexanoate. It is of course also possible to use azo initiators with reactive silicone groups, of the kind described in EP-A-159 715 and EP-A-159 716 (both of which are incorporated by reference), for example. Examples of suitable regulators are mercaptosilanes and other compounds described in International patent application WO88/02010, incorporated herein by reference.

The equivalent weight of silane functionality for the polymer may be from about 400 to about 2000, in certain specific embodiments from about 450 to about 750, and in other specific embodiments from about 500 to about 600 grams per equivalent.

A polyurethane having a plurality of alkoxysilane groups may be prepared by reacting one or more polyols with an equivalent excess of one or more polyisocyanates to form an isocyanate-containing prepolymer, which is then further reacted with an amino-functional alkoxysilane. Alternatively, a hydroxyl-functional polyester or polyurethane can be prepared by polymerization using an equivalent excess of one or more polyols, then the hydroxyl-functional polymer can be reacted with an equimolar amount or an excess of isocyanate-functional alkoxysilane. Nonlimiting examples of aminoorganotrialkoxysilanes include: beta-aminoethyltrimethoxysilane, beta-aminoethyltriethoxysilane, beta-aminoethyltributoxysilane, beta-aminoethyltripropoxysilane, alpha-aminoethyltrimethoxysilane, alpha-aminoethyltriethoxysilane, gamma-aminopropyltrimethoxysilane, gamma-aminopropyltriethoxysilane, gamma-aminopropyltributoxysilane, gamma-aminopropyltripropoxysilane, beta-aminopropyltrimethoxysilane, beta-aminopropyltriethoxysilane, beta-aminopropyltripropoxysilane, beta-aminopropyltributoxysilane, alpha-aminopropyltrimethoxysilane, alpha-aminopropyltriethoxysilane, alpha-aminopropyltributoxysilane, alpha-aminopropyltripropoxysilane, N-aminomethylaminoethyltrimethoxysilane, N-aminomethylaminomethyltripropoxysilane, N-aminomethyl-beta-aminoethyltrimethoxysilane, N-aminomethyl-beta-aminoethyltriethoxysilane, N-aminoethyl-beta-aminoethyltripropoxysilane, N-aminomethyl-gamma-aminopropyltrimethoxysilane, N-aminomethyl-gamma-aminopropytriethoxysilane, N-aminomethyl-gamma-aminopropyltripropoxysilane, N-aminomethyl-beta-aminopropyltrimethoxysilane, N-aminomethyl-beta-aminopropyltriethoxysilane, N-aminomethyl-beta-aminopropyltripropoxysilane, N-aminopropyltripropoxysilane, N-aminopropyltrimethoxysilane, N-(beta-aminoethyl)-beta-aminoethyltrimethoxysilane, N-(beta-aminoethyl)-beta-aminoethyltriethoxysilane, N-(beta-aminoethyl)-beta-aminoethyltripropoxysilane, N-(beta-aminoethyl)-beta-aminoethyltrimethoxysilane, N-(beta-aminoethyl)-alpha-aminoethyltriethoxysilane, N-(beta-aminbethyl)-alpha-aminoethyltripropoxysilane, N-(beta-aminoethyl)-beta-aminopropyltrimethoxysilane, N-(beta-aminoethyl)-gamma-aminopropyltriethoxysilane, N-(beta-aminoethyl)-gamma-aminopropyltripropoxysilane, N-(beta-aminoethyl)-gamma-aminopropyltrimethoxysilane, N-(beta-aminoethyl)-beta-aminopropyltriethoxysilane, N-(beta-aminoethyl)-beta-aminopropyltripropoxysilane, N-(gamma-aminopropyl)-beta-aminoethyltrimethoxysilane, N-(gamma-aminopropyl)-beta-aminoethyltriethoxysilane, N-(gamma-aminopropyl)-beta-aminoethyltripropoxysilane, N-methylaminopropyltrimethoxysilane, beta-aminopropylmethyldiethoxysilane, gamma-diethylenetriaminopropyltriethoxysilane, ureidopropyltrimethyloxysilane, and N-phenyl-3-aminopropyltriethoxysilane. Nonlimiting examples of suitable alkoxysilane-functional monoisocyanates include isocyanatomethyltrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane, and 3-isocyanatopropylmethyldiethoxysilane. U.S. Pat. No. 7,812,087, incorporated herein by reference, teaches preparing alkoxysilane-functional prepolymers by A) reacting some or all of the urethane groups and/or urea groups of alkoxysilane-functional polyurethane prepolymers with monoisocyanates of the formula, R—NCO to form allophanate groups and/or biuret groups or B) reacting some or all urethane groups and/or urea groups of alkoxysilyl-free polyurethane prepolymers with monoisocyanates of the formula R—NCO to form allophanate groups and/or biuret groups, the radical R having at least one alkoxysilyl group, such as the alkoxysilane-functional monoisocyanates just mentioned.

Syntheses of hydroxyl-functional and isocyanate-functional polyurethanes and synthesis of hydroxyl-functional polyesters that may be used to preparing alkoxysilane-functional polyurethanes and polyesters are well-known. In general, hydroxyl-functional polyesters may be formed by condensation polymerization of polycarboxylic acids or polymerization derivates such as anhydrides low carbon number (C1-4) esters of such acids with an equivalent excess of polyols and/or epoxides. Useful polyesters include in particular linear polyesters, formed by reaction products of dicarboxylic acids or derivatives thereof and diols or diepoxides, or those having a limited amount of branching introduced by a reactant with a functionality greater than two, optionally in combination with a monofunctional reactant. Specifically, an excess of equivalents of the polyol is used so that the polyester has terminal hydroxyl groups. Alternatively, if an excess of equivalents of acid functionality is used so that an acid-terminated polyester is formed, the terminal acid groups can be reacted or capped with a compound that has three or more hydroxyl groups, such as a triol, tetraol, and the like.

The polycarboxylic acids may include any of aromatic, aliphatic and cycloaliphatic polycarboxylic acids. Examples of useful dicarboxylic acids reactants include, without limitation, oxalic acid, malonic acid, succinic acid, glutaric acid, adipic acid, maleic acid, pimelic acid, terephthalic acid, isophthalic acid, phthalic acid, tetrahydrophthalic acid, hexahydrophthalic acid, fumaric acid, azelaic acid, sebacic acid, dimer fatty acid, benzenetricarboxylic acids, methyl hexahydrophthalic acid, glutamic acid, the anhydrides of these acids, and lower esters of these with aliphatic alcohols having one to four carbon atoms, as well as combinations of these. The cycloaliphatic polycarboxylic acids may be employed either in their cis or in their trans form or as a mixture of the two forms.

Optionally, minor amounts of monocarboxylic acids can also be used with the polycarboxylic acids, particularly when higher functional (e.g., tri- or tetracarboxylic) acids are included. Examples of useful monocarboxylic acids are benzoic acid, tert-butylbenzoic acid, lauric acid, isonoanoic acid and fatty acids of naturally occurring oils.

Examples of polyols suitable for the preparation of the hydroxyl-functional polyester include, without limitation, 1,4-butanediol, 1,3-butanediol, 2,3-butanediol, 1,2,4-butanetriol, 1,6-hexanediol, 1,2,6-hexanetriol, neopentyl glycol, ethylene glycol, propylene glycol, pentaerythritol, oligomers of these such as diethylene glycol, triethylene glycol, dipropylene glycol, and dipentaerythritol, glycerol, trimethylolpropane, cylcohexanedimethanols, 2-methyl-2-ethyl-1,3-propanediol, 2-ethyl-1,3-hexanediol, 1,5-pentanediol, thiodiglycol, 1,3-propanediol, 2,2,4-trimethyl-1,3-pentanediol, cyclohexanediols, mannitol, sorbitol, and combinations of these. Compounds having both acid and alcohol groups may be included, nonlimiting examples of which are dimethylolpropionic acid, ricinoleic acid, and 12-hydroxylstearic acid. The polyol component may also include, if desired, minor amounts of monohydric alcohols, for example butanol, octanol, lauryl alcohol, and ethoxylated and propoxylated phenols. Polyesters may also be prepared using lactones such as ε-caprolactone and δ-butyrolactone or polylactone polyols prepared using these, for example the reaction product of one or more moles of ε-caprolactone and a diol such as ethylene glycol. In another embodiment, a polyester polyol can be modified by reaction with a lactone after the polyester polymerization.

Techniques for preparing polyesters are well known. The reaction may be conventionally carried out at temperatures of between 180 and 280° C. in the presence, if desired, of an appropriate esterification catalyst, for example lithium octanoate, dibutyl tin oxide, dibutyltin dilaurate, para-toluene sulfonic acid, and the like.

A hydroxyl- or isocyanate-functional polyurethane can be synthesized by reacting at least one polyol, specifically a diol, with at least one polyisocyanate, specifically a diisocyanate. The polyisocyanate can be an aliphatic polyisocyanate, including a cycloaliphatic polyisocyanate, or an aromatic polyisocyanate. Useful examples include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanate, the isocyanurate of toluene diisocyanate, diphenylmethane 4,4'-diisocyanate, the isocyanurate of diphenylmethane 4,4'-diisocyanate, methylenebis-4,4'-isocyanatocyclohexane, isophorone diisocyanate, the isocyanurate of isophorone diisocyanate, 1,6-hexamethylene diisocyanate, the isocyanurate of 1,6-hexamethylene diisocyanate, 1,4-cyclohexane diisocyanate, p-phenylene diisocyanate, triphenylmethane 4,4',4''-triisocyanate, tetramethyl xylene diisocyanate, and meta-xylene diisocyanate.

The polyol can be the same as the polyols described above for the preparation of polyesters. In one or more embodiments, at least one oligomeric or polymeric polyol is used to prepare the polyurethane. Non-limiting examples of oligomeric or polymeric polyols are polyester polyols and polyether polyols. Polyester polyols or polyether polyols used in the synthesis of a film-forming polyurethane typically have a number average molecular weight of about 400 to about 5000. A polyester polyol can be prepared as already described. Polyether polyols may be obtained by the alkoxylation of polyols (generally of monomeric polyols, but in certain embodiments the polyol that is alkoxylated may be one of the acrylic polymer polyols and polyester polyols already described), water, organic polyamines having at least two N—H bonds, and mixtures of these. In one or more embodiments, alkylene oxides for the alkoxylation reaction are ethylene oxide and propylene oxide which may be used in the alkoxylation reaction alone, in admixture, or in any sequence.

Non-limiting examples of polyether polyols are polyalkylene ether polyols that include poly(oxytetraethylene)glycols, poly(oxy-1,2-propylene)glycols and poly(oxy-1,2-butylene)glycols. Also useful are polyether polyols formed by oxyalkylation of various polyols, for example, glycols such as ethylene glycol, 1,6-hexanediol, bisphenol A and the like, or other higher polyols, such as trimethylolpropane, pentaerythritol and the like. Useful polyols of higher functionality can be made, for instance, by oxyalkylation of compounds such as sorbitol or sucrose. One commonly utilized oxyalkylation method is to react a polyol with an alkylene oxide, for example, ethylene or propylene oxide, in the presence of an acidic or basic catalyst.

Two general synthetic approaches may be utilized to prepare a linear polyurethane resin. A polyurethane having terminal hydroxy functionality can be obtained by reacting a diisocyanate and a diol in an OH:NCO equivalent ratio of greater than 1:1. In this case, the polyurethane resin formed will have terminal hydroxyl groups as a result of the equivalent excess of the polyol. Alternatively, the polyurethane may be formed by reacting diisocyanate and diol in an OH:NCO ratio of less than 1:1, forming a polyurethane having terminal isocyanate functionality, and then reacting the terminal isocyanate groups in a second step, sometimes called a capping step, with a compound having at least one group reactive with isocyanate functionality, which may be, for example, a hydroxyl group or a primary or secondary amine group, and at least one (or at least one additional) hydroxyl group or at least one group that can be converted into a hydroxyl group. Suitable capping agents include, without limitation, aminoalcohols such as ethanolamine and diethanolamine, solketal, diols such as neopentyl glycol, triols such as trimethylolpropane, and mixture of these. This method is useful for providing a plurality of hydroxyl groups at each end of the polymer. An isocyanate-functional polyurethane with a plurality of isocyanate groups at each end can be prepared analogously by capping a hydroxyl-functional linear polyurethane with an isocyanate with three or more isocyanate groups, while care should be taken to avoid further polymerization, for example by partially blocking the polyisocyanates until after the capping reaction is complete. When a polyisocyanate or polyol of functionality greater than two is included, the polyurethane will have some branching. A monofunctional isocyanate or alcohol may then be added also for molecular weight control.

Examples of suitable amine-based catalysts which may be used for the polyurethane polymerization reaction include tertiary amines such as, for example, triethylenediamine, N-methylmorpholine, N-ethylmorpholine, diethylethanolamine, N-cocomorpholine, 1-methyl-4-dimethylaminoethylpiperizine, 3-methoxypropyidimethylamine, N,N,N'-trimethylisopropylpropylenediamine, 3-diethylaminopropyldiethylamine, dimethylbenzylamine, and the like. Other suitable catalysts are metal-based catalysts, for example, stannous chloride, dibutyltin di-2-ethyl hexanoate, stannous oxide, as well as other organometallic compounds including potassium-, zinc-, mercury-, and lead-based catalysts. Other useful catalysts are disclosed in U.S. Pat. No. 2,846,408, which is hereby incorporated by reference. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2 percent by weight based on total weight of the reactants.

The alkoxysilane-functional polyurethane or polyester polymer specifically has a number-average molecular weight $M_n$ of from 1000 to 20,000 daltons, more particularly from about 4000 to about 12,000 daltons, measured in each case by means of gel permeation chromatography (GPC) against a polystyrene standard. In one or more embodiments, aliphatic polyurethanes and polyesters are used when the coating composition is an automotive topcoat composition.

As in the case of the acrylic polymers, polyurethane or polyester polymers that contain ethoxysilyl groups rather than methoxysilyl groups may have the advantage that their curing releases the less toxicologically objectionable ethanol, and not the toxicologically objectionable methanol. Nonlimiting examples of monomers with ethoxysilyl groups that can be used in preparing the polyurethane having a plurality of alkoxysilane groups from an isocyanate-functional polyurethane include gamma-aminotriethoxysilane and N-cyclohexylaminomethyltriethoxysilane.

Suitable polymerization solvents for the polyurethane or polyester polymerization include any of those nonreactive solvents already mentioned as useful in polymerizing the acrylic polymer with alkoxysilane groups.

The polymers having alkoxysilane groups may be used in the coating compositions in an amount of 60.0% to 99.0%, or in an amount of 70% to 99.0%, or in an amount of 85.0% to 95.0%, by weight, based in each case on the weight of the binder (the film-forming nonvolatile constituents) of the coating composition of the invention.

The polymer having a plurality of alkoxysilane groups may also have acetoacetate functionality. Acetoacetate functionality may be included by including in the polymerization reaction one or monomers having an acetoacetate group. Nonlimiting examples of ethylenically unsaturated monomers having one or more acetoacetate groups that may be included in the polymerization reaction of the alkoxysilane-functional acrylic polymer include those having a structure

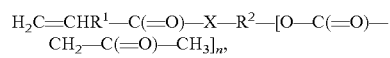

in which the group $R^1$ is a hydrogen atom or a methyl group, X is an oxygen atom or an NH group, the group $R^2$ is an organic group having 1 to 26 carbon atoms, and n is an integer of 2 to 4. The molecular weight of such a monomer is generally not higher than 500, and in various embodiments it may be 140 to 300. The organic group $R^2$ may contain urethane groups, ether groups, and/or ester groups, for example obtained from a lactone, such as ε-caprolactone, or an epoxide compound or isocyanate compound such as an alkylene oxide, glycidol, a glycidyl ester of a monocarboxylic acid containing 2 to 18 carbon atoms or an adduct of a diisocyanate and a diol. These monomer units are obtained, for instance, by acetoacetylation of an adduct of a lactone, a monoepoxide compound or a diisocyanate reacted with a diol to a hydroxyalkyl(meth)acrylate. Examples of other suitable acetoacetate monomer units include allyl acetoacetate and acetoacetic esters of ethylenically unsaturated diols or triols such as 2-butene-1,4-diacetoacetate and (2-methylene acetoacetyl)-1-propene-3-acetoacetate. Other nonlimiting specific examples include acetoacetoxy methyl methacrylate, acetoacetoxy ethylmethacrylate, acetoacetoxy propylmethacrylate, and acetoacetoxy butylmethacrylate.

The disclosed one-component, curable coating compositions may optionally include a compound or separate polymer having acetoacetate functionality that has no alkoxysilane group. In various embodiments, the coating compositions may contain an acetoacetate-functional compound or oligomer with at least two acetoacetate groups and a molecular weight of up to about 1000. The acetoacetate-functional compound may have 2 to 5, in certain embodiments 3 to 5 or 3 or 4 acetoacetate groups. The acetoacetate-functional material may be prepared using low molecular weight polyhydroxy compounds or oligomers having two or more hydroxyl groups, specifically two or three hydroxyl groups. Nonlimiting examples of suitable low molecular weight polyhydroxy compounds and oligomers include ethylene glycol, propylene glycol, trimethylolpropane and 1,6-dihydroxyhexane; hydroxyl group-containing esters of such polyols with dicarboxylic acids, polycarboxylic acid, or anhydrides of these; ethoxylated and/or propoxylated polyhydroxyl compounds; and mixtures of these modified or unmodified polyhydric alcohols. The polyol compound may also be based on reaction of an oxirane-functional compound, for example a glycidyl ester or ether, with an acid-functional compound. Either the oxirane-functional compound or the acid-functional compound should be polyfunctional to provide a polyol product. In one embodiment, a polyol is reacted with an anhydride, then the resulting polycarboxylic acid compound is reacted with a monofunctional glycidyl ester or ether to produce a beta-hydroxy ester.

The acetoacetate functionality may be introduced to the polyol or polyol oligomer by reaction with an alkyl acetoacetate, such as, for example, tert-butyl acetoacetate, methyl acetoacetate or ethyl acetoacetate. The transesterification may be carried out with heat and distillation of the by-product lower-boiling alcohol, if appropriate under vacuum. The esterification of the hydroxyl groups can also be carried out with acetoacetic acid derivatives such as for example, diketene or 2,2,6-trimethyl-1,3-dioxan-4-one. The reaction may be carried out in bulk or in solution at temperatures between room temperature and 150° C., using an esterification catalyst if desired. All of the hydroxyl groups are transesterified to provide the acetoacetate functionality. In the case of a beta-hydroxy ester, the acetoacetate group is beta to an ester linkage. The acetoacetate compound may have at least two, specifically from two to about five, more specifically from two to four acetoacetate groups. The molecular weight of an oligomeric acetoacetate compound may be from about 150 to about 980, specifically from about 250 to about 980.

An acrylic polymer having acetoacetate groups may be prepared by polymerizing one or more ethylenically unsaturated monomers having one or more acetoacetate groups as described above with any desired comonomer, such as those described above. Alternatively a hydroxyl group of a hydroxy-functional addition polymer can be converted into an acetoacetate group by transesterification using one or more acetoacetic acid esters or other derivatives in the manner described for preparing an acetoacetate-functional compound or oligomer. A polyurethane or polyester having acetoacetate groups may similarly be prepared from a hydroxyl-functional polyurethane or polyester.

In various embodiments, the coating composition may comprise up to about 50 wt. %, specifically up to about 25 wt. %, based on total binder weight, of the compound or separate polymer having acetoacetate functionality that has no alkoxysilane group. "Binder" refers to the film-forming materials (e.g., polymers, crosslinkers, and other materials that form the organic film structure on a substrate) in the coating composition.

The one-component, curable coating compositions also include a polymer or compound having at least one epoxide group connected to the polymer or compound through ester linkages, ether linkages, or a combination of ester linkages and ether linkages. Suitable, nonlimiting examples of epoxide-functional resins include: butyl glycidyl ether; phenyl glycidyl ether; p-butyl phenol glycidyl ether; polyglycidyl ethers of polyhydric polyols; the polyglycidyl esters of aliphatic, cycloaliphatic, or aromatic polycarboxylic acids; the polyglycidyl ethers of polyphenols, (e.g., bisphenol A); and novolak resins (e.g., epoxy phenol novolak resins and epoxy cresol novolak resins). Other nonlimiting examples of suitable epoxide-functional materials include polyglycidyl esters and poly-(β-methylglycidyl) esters, which can be obtained by reaction of a compound containing two or more carboxylic acid groups per molecule with epichlorohydrin, glycerol dichlorohydrin or β-methylepichlorohydrin in the presence of an alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerized or trimerized linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from aromatic polycarboxylic acids or their perhydrogenated counterparts of polycarboxylic acids, such as phthalic acid, isophthalic acid and terephthalic acid succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (dimer fatty acid) may also be used in the formation of these polyglycidyl esters of polycarboxylic acids. The polyglycidyl compound is specifically aliphatic, more specifically cycloaliphatic.

The polyglycidyl compound specifically has from 2 to about 4 glycidyl groups, and more specifically 2 glycidyl groups. Other examples are polyglycidyl ethers and poly-(β-methylglycidyl)ethers which are obtainable by reaction of a compound containing at least two free alcoholic and/or phenolic and/or perhydrophenolic hydroxyl groups per molecule with the corresponding epichlorohydrin under alkaline conditions, or in the presence of an acid catalyst, with subsequent treatment with an alkali. These ethers can be prepared using epichlorohydrin reacted with acyclic alcohols, such as ethylene glycol, diethylene glycol and higher poly-(oxyethylene)glycols, propane-1,2-diol and poly-(oxypropylene)glycols, propane-1,3-diol, butane-1,4-diol, poly-(oxytetramethylene)glycols, pentane-1,5-diol, hexane-1,6-diol, hexane-2,4,6-triol, glycerol, 1,1,1-trimethylolpropane, pentaerythritol and sorbitol, from cycloaliphatic alcohols, such as resorcitol, quinitol, bis-(4-hydroxycyclohexyl)-methane, 2,2-bis-(4-hydroxycyclohexyl)-propane and 1,1-bis-(hydroxymethyl)-cyclohex-3-ene. These compounds may also be derived from polymeric polyols, such as polypropylene glycol, and from alcohols having aromatic groups, such as N,N-bis-(2-hydroxyethyl)-aniline and p,p'-bis-(2-hydroxyethylamino)-diphenylmethane. They can furthermore be prepared from mononuclear phenols, such as resorcinol and hydroquinone, as well as polynuclear phenols, such as bis-(4-hydroxyphenyl)-methane, 4,4-dihydroxydiphenyl, bis-(4-hydroxyphenyl) sulfone, 1,1,2,2-tetrakis-(4-hydroxyphenyl)-ethane, 2,2-bis-(4-hydroxyphenyl)-propane (otherwise known as bisphenol A) and 2,2-bis-(3,5-dibromo-4-hydroxyphenyl)-propane, as well as novolaks formed from aldehydes, such as formaldehyde, acetaldehyde, chloral, and furfurol, with phenols, such as phenol itself and phenol that is substituted on the ring by chlorine atoms or alkyl groups having in each case up to nine carbon atoms, such as 4-chlorophenol, 2-methylphenol, and 4-tert-butylphenol.

In one or more specific embodiments, an epoxide-functional polymer is an acrylic copolymer with epoxide functionality. The epoxide groups may be introduced into the polymer by incorporating glycidyl methacrylate, glycidyl acrylate, or butanediol monoacrylate glycidyl ether.

The ratio of epoxide groups to silane groups in the coating composition may be in the range of from about 1:1 to about 1:10, specifically from about 1:1.5 to about 1:3, more specifically from about 1:1.8 to about 1:2.2.

The one-component, curable coating compositions are free of, or essentially free of, polymers with hydroxyl groups, primary amine groups, and secondary amine groups (i.e., amine groups with at least one active hydrogen, >N—H). The limitation of "essentially free of" means that the coating composition includes no more than about 5 wt. %, specifically no more than about 1%, and particularly specifically no amount of a polymer that has a content of hydroxyl groups, primary amine groups, and secondary amine groups of more than about 5 wt. %, specifically no more than about 1 wt. %, and particularly specifically no more than about 0.5 wt. % on average.

The one-component, curable coating compositions further include a chelated metal alkoxide, in which the metal is aluminum, titanium, or zirconium, or a mixture of such chelated metal alkoxides. Examples of chelating ligands include, without limitation, acetylacetonate, ethyl acetylacetonate, triethanolamine, lactic acid and its salts such as the ammonium salt, glycolic acid and its salts, and esters of citric acid, such as diethyl citrate. In one or more embodiments, low-color compounds or chelated compounds are generally used. Specific examples of suitable compounds include, without limitation, di-sec-alkoxy metal alkoxide chelates such as triisopropyl aluminum alkoxide substituted with pentanedione or another dicarbonyl compound (e.g. an acetoacetate compound), aluminum di-sec-butoxide ethylacetoacetate chelate, and aluminum di-isopropoxide ethylacetoacetate chelate, aluminum triethylacetoacetonate, titanium tetra-n-butoxide, titanium di-n-butoxide bis-2,4-pentanedioate, titanium diisopropoxide bis (ethylacetoacetate), titanium diisopropoxide bis(2,4-pentanedioate), zirconium n-butoxide, and zirconium 2,4-pentanedioate.

The amount of the metal alkoxide, chelate, or metal alkoxide chelate compound included in the coating is typically 0.5-20%, based on total binder weight.

The disclosed one-component, curable coating compositions further include a monofunctional di- or trialkoxysilane compound, which may be volatile. Nonlimiting examples of the monofunctional di- or trialkoxysilanes are methyltrimethoxysilane, propyltrimethoxysilane, 2-methylpropyltrimethoxysilane, 2,4,4-trimethylpentyltrimethoxysilane, octyltrimethoxysilane, hexadecyltrimethoxysilane, octadecyltrimethoxysilane, cyclohexyltrimethoxysilane, vinyltrimethoxysilane, phenyltrimethoxysilane, 3-glycidyloxypropyltrimethoxysilane, 2-(3,4-epoxycyclohexyl)-ethyltrimethoxysilane, 3-methacryloxypropyltrimethoxysilane, 3-acryloxypropyltrimethoxysilane, 3-isocyanatopropyltrimethoxysilane, N-trimethoxysilylpropyl-O-methyl-carbamate, S-octanoyl-mercaptopropyltrimethoxysilane; mercaptosilanes, for example, 3-mercaptopropyltrimethoxysilane; primary and secondary aminosilanes, for example, 3-aminopropyltrimethoxysilane, N-methyl-3-aminopropyl-trimethoxysilane, N-butyl-3-aminopropyltrimethoxysilane, N-phenyl-3-aminopropyltrimethoxysilane, N-cyclohexyl-3-aminopropyltrimethoxysilane, N-ethyl-3-aminoisobutyltrimethoxysilane, bis-(3-trimethoxysilylpropyl)amine, 3-mercaptopropyltrimethoxysilane, as well as the products that include the Michael-like addition of primary aminosilanes, such as, for example, 3-aminopropyltrimethoxysilane, with acrylonitrile, maleic or fumaric acid diesters, citraconic acid diesters, acrylic and methacrylic acid esters, acrylic and methacrylic acid amides and itaconic acid diesters, reacted in the molar ratio 1:1; and corresponding organomethoxysilanes, which have a dimethoxymethylsilane group instead of the trimethoxysilane group.

The monofunctional di- or trialkoxysilane compound may be used in amounts of from about 2 wt % to about 9 wt %, specifically from about 3 wt % to about 6 wt %, and more specifically from about 4 wt % to about 5 wt %, based on binder weight.

The disclosed one-component, curable coating compositions may include one or more further, optional ingredients including water scavenging additives and/or other additives known to be useful in coating compositions, volatile dicarbonyl compounds, pigments, and extenders.

Nonlimiting examples of suitable water scavenging additives include calcium compounds like $CaSO_4 \cdot \frac{1}{2}H_2O$ and calcium-metal alkoxides, titanates like tetraisopropyltitanate, and organic alkoxy compounds like triethylorthoformate, methylorthoformate, and dimethoxypropane. The disclosed one-component, curable coating compositions may include one or more water scavengers in an amount of from about 0.25 wt. % to about 5 wt. % based on total coating composition weight.

The disclosed one-component, curable coating compositions may include volatile dicarbonyl compounds, for example 2,4-pentanedione, methyl acetoacetate, ethyl acetoacetate, 3-methyl-2,4-pentandione, and 2-acetylcyclopentanone.

Other solvent or solvents may be selected from aliphatic solvents or aromatic solvents, for example ketones, esters, acetates, toluene, xylene, aromatic hydrocarbon blends, or a combination of any of these.

The disclosed one-component, curable coating compositions may include other additives known to be useful in coating compositions such as rheology control agents, stabilizers, antioxidants, UV absorbers, hindered amine light stabilizers, and so on in effective amounts, such as in amounts of up to 30%, more specifically up to 25%, and in particular up to 20%, by weight, based in each case on the weight of the nonvolatile constituents of the coating composition.

Examples of suitable coatings additives are:
in particular, UV absorbers;
in particular, light stabilizers such as neutral HALS compounds, triazines, or oxalanilides;
free-radical scavengers;
slip additives;
defoamers;
wetting agents such as siloxanes, fluorine compounds, carboxylic acid monoesters, phosphoric esters, polyacrylic acids and their copolymers or polyurethanes;
adhesion promoters such as tricyclodecanedimethanol;
flow control agents;
film-forming assistants such as cellulose derivatives;
rheology control additives, such as the additives known from patents WO 94/22968, EP-A-0 276 501, EP-A-0 249 201 or WO 97/12945; crosslinked polymeric microparticles, as are disclosed, for example, in EP-A-0 008 127; inorganic phyllosilicates such as aluminum magnesium silicates, sodium magnesium phyllosilicates, and sodium magnesium fluorine lithium phyllosilicates of the montmorillonite type; silicas such as Aerosils; or synthetic polymers having ionic and/or associative groups such as polyvinyl alcohol, poly (meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
and/or flame retardants.

The disclosed one-component, curable coating compositions may be clearcoat compositions or may include one or more pigments and/or fillers. The pigment or filler may be any organic or inorganic compound or colored material, metallic or other inorganic flake material such as pearlescent mica flake pigments or metallic flake pigments such as aluminum flake, and the like that the art normally includes in such coatings. Such pigments may be used singly or in combination to provide a desired color of color base. Inorganic pigments include metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, and lead molybdate. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. Pigments and other insoluble particulate compounds such as fillers may be used in the refinish monocoat composition mixture in an amount of 1% to 100%, based on the total nonvolatile vehicle (i.e., a pigment-to-binder ratio of 0.1 to 1). The fillers or pigments can be introduced by first forming a mill base (also called pigment grind) with the hydroxyl functional resin or with other compatible polymers or dispersing resins by conventional techniques, such as sandgrinding, ball-milling, attritor grinding, and two roll milling, to disperse the pigments. Flake pigments, however, are typically slurried in a dispersing resin without grinding to avoid breaking or bending the flakes.

The coating compositions of the invention can be applied by all of the customary application methods, such as spraying, knife coating, spreading, dipping, pouring, impregnating, trickling or rolling, for example. In the course of such application, the substrate to be coated may itself be at rest, with the application equipment or unit being moved. Alternatively it is also possible for the substrate to be coated, a coil in particular, to be moved, with the application unit being at rest relative to the substrate or being moved in an appropriate way. In one or more embodiments, spray application methods, such as, for example, compressed air spraying, airless spraying, high-speed rotation, electrostatic spray application (ESTA), pneumatic spray application with a spray gun are employed. In one or more specific embodiments, pneumatic spray application with a spray gun is employed.

A method of refinishing a substrate includes applying the one-component, curable coating composition to all of the surface or to an area that is less than all of the surface of a substrate and curing the applied composition mixture to form a cured coating layer from the applied coating composition. Also provided is the cured coating and the article having on it the cured coating. In particular embodiments, the method is used to repair a damages portion of an existing coating on an article, such as an automotive vehicle, so that the one-component, curable coating composition can be applied to the whole surface of the article (by which is meant the whole paintable surface, the surface of an automotive vehicle excluding, e.g., its glass surfaces, or the whole surface of a body panel, fender, door, deck lid, hood, or other part of an automotive vehicle) or any area that is less than the whole surface of the article (e.g., repair of only a damaged portion of the paintable surface of an automotive vehicle or of a part such as a door, fender, or body panel, deck lid, hood, or other part of an automotive vehicle).

The disclosed one-component, curable coating compositions may be formulated and used as a refinish clearcoat or single stage topcoat, which is applied in a layer to a desired area of the substrate to be refinished and cured. The clearcoat would usually be applied over an applied basecoat layer, which may also be the one-component, curable coating composition including one or more pigment. The basecoat layer is allowed to dry before the clearcoat composition is applied. The clearcoat/basecoat composite topcoat layers are or single stage topcoat layer is then cured, at ambient or low temperature bake conditions. The curing of coating compositions of the invention has no peculiarities but can instead take place at ambient temperature or at elevated temperatures of up to 200° C. Where the coating compositions are used for automotive refinish or for the coating of plastics parts for surface mounting, curing takes place at ambient temperature or at slightly elevated temperatures of not more than 90° C., in particular of not more than 60° C. The thermal cure at temperatures of not more than 90° C. can be accomplished with customary and known apparatus, such as heating bands and also heating lamps which emit near and far infrared. The temperatures employed and the duration of the heating are guided by the requirements of the case in hand, in particular by the reactivity of the thermally curable constituents, and can be selected and adjusted by the skilled worker in a simple way on the basis of his or her general art knowledge and his or her skilled ability. Advantageously the cure takes place at a temperature of 20 to 90° C., specifically 40 up to a maximum of 60° C., for a time of 1 minute up to 10 hours, more specifically 20 minutes up to 5 hours.

By virtue of the curing at low temperatures, the coating compositions described are suitable in particular for the refinishing of automobile bodies, including the refinishing of original finishes on the line, and/or for the coating of plastics moldings or plastics parts for surface mounting for automobile bodies, particularly for bodies of automobiles of the top class, such as, for example, for producing roofs, tailgates, hoods, wings, fenders, spoilers, sills, protective strips, side trim elements, and the like. The disclosed one-component, curable coating compositions may be formulated and used as a refinish clearcoat or single stage topcoat, which is applied in a layer to a desired area of the substrate to be refinished and cured. The clearcoat would usually be applied over an applied basecoat layer, which may also be the one-component, curable coating composition including one or more pigments but which need not be glossy. A single stage topcoat includes a colorant and is formulated as a glossy, single-layer alternative to the two-layer clearcoat/basecoate composite topcoat. The basecoat layer is allowed to dry before the clearcoat composition is applied. The clearcoat/basecoat composite topcoat layers are or the single stage topcoat layer is then cured, at ambient or low temperature bake conditions.

The refinished substrate may be an automotive vehicle or a component of an automotive vehicle. The refinish coating compositions may, however, be applied to other articles for which a protective and/or decorative coating is desirable. Such articles may be those having parts or substrates that cannot withstand high temperature curing conditions or that cannot easily be placed in a high-bake oven.

Alternatively the coating compositions be used for the OEM coating of bodies of means of transport (especially motor vehicles, such as motor cycles, buses, trucks or automobiles) or of parts thereof, or of components for shipbuilding and aircraft construction, and for automotive OEM finishing; for the coating of built structures, in the interior and exterior segments; of furniture, windows, and doors; of plastics moldings, especially CDs and windows; of small industrial parts, of coils, containers, and packaging; of white goods; of components for household and electrical appliances, of films; of optical, electrical and mechanical components; and also of hollow glassware and of articles of everyday use.

The coating compositions of the invention provide new cured coatings, especially refinishes, having a very good overall visual appearance. These resulting coatings are, in particular, free from surface defects and have a high transparency. In addition, the coating compositions of the invention are notable for rapid curing in the presence of moisture, and at the same time have a potlife of at least 30 minutes, more particularly of at least 2 hours. As a result of the at least proportional use of acrylate- and/or methacrylate-functional alkoxysilanes with ethoxy groups rather than methoxy groups for preparing the binders, moreover, it is possible to provide coating compositions which on curing release very little methanol and yet exhibit the requisite fast curing.

The coatings and methods are further described in the following example. The examples are merely illustrative and not limiting. All parts are by weight unless otherwise indicated.

Example 1

Aromatic 100 (434.8 grams) and n-butyl acetate (218.0 grams) were heated to 148° C. in a reaction vessel fitted with an agitator, nitrogen inlet, and a condenser. A mixture of 666.7 grams of methyl methacrylate, 83.3 grams of 2-ethylhexyl acrylate, 541.7 grams of glycidyl methacrylate, 44.3 grams of t-butyl peracetate (50% in mineral spirits), and 211.2 grams of Aromatic 100 solvent was uniformly added to the reaction vessel over four hours. The contents of the reaction vessel were held for one hour, then the contents were cooled to 105° C. One gram of t-butyl peroctoate and 57.3 grams Aromatic 100 solvent were then added to the reaction vessel uniformly over 15 minutes and held for an additional two hours at 105° C. The solution was then cooled and 418.2 grams of n-butyl acetate were added. The resulting acrylic copolymer had a number average molecular weight of about 4,500 and a weight average molecular weight of about 12,000 (GPC, polystyrene standard).

Example 2

Aromatic 100 (816.3 grams) was heated to 148° C. in a reaction vessel fitted with an agitator, nitrogen inlet, and a condenser. A mixture of 1255.7 grams of methyl methacrylate, 209.2 grams of 2-ethylhexyl acrylate, 313.9 grams of iso-butyl methacrylate, 313.9 grams of methacryloxypropyl trimethoxysilane, 37.2 grams of t-butyl peracetate (50% in mineral spirits), and 89.1 grams of Aromatic 100 solvent was uniformly added to the reaction vessel over four hours. The contents of the reaction vessel were held for one hour, then the contents were cooled to 105° C. 1.1 grams of t-butyl peroctoate and 82.6 grams Aromatic 100 solvent were then added to the reaction vessel uniformly over 15 minutes and the contents of the reaction vessel were held for an additional three hours at 105° C. The contents of the reaction vessel were then cooled and 370.0 grams of Aromatic 100 solvent was added. The resulting acrylic copolymer had a number average molecular weight of about 8,500 and a weight average molecular weight of about 19,000 (GPC, polystyrene standard).

Example 3

| Material | Wt. (grams) |
| --- | --- |
| Isobutyl alcohol | 9.36 |
| Byk 325 | 0.18 |
| Tego Glide 410 | 0.04 |
| Drapex 4.4 | 1.97 |
| Diethyl Malonate | 9.36 |
| Triethyl Ortho Formate | 1.87 |
| Silquest A-171 | 1.87 |
| ATC-30 | 11.33 |
| Example 2 acrylic | 43.44 |
| Example 1 acrylic | 14.51 |
| Oxsol 100 | 6.07 |
| Total | 100 |

Byk 325 (Byk Chemie) and Tego Glide 410 (Evonik) are flow additives.
Drapex 4.4 (Chemtura) is an epoxidized octyl tallate plasticizer
Silquest A-171 (Momentive) is vinyl trimethoxysilane
ATC-30 (Chattem) is an aluminum chelate
Oxsol 100 (Occidental) is parachlorobenzotrifluoride The above formula, when sprayed using equipment typical to the automotive refinish industry, results in a coating that dries quickly and yields a hard, glossy film with good physical properties.

The invention has been described in detail with reference to specific embodiments thereof. It should be understood, however, that variations and modifications can be made within the spirit and scope of the invention.

What is claimed is:

1. A one-component, curable coating composition comprising:
   (a) a polymer having a plurality of alkoxysilane groups;
   (b) a polyepoxide having a plurality of epoxide groups connected through ester linkages, ether linkages, or a combination of ester linkages and ether linkages;
   (c) a chelated metal alkoxide, wherein the metal is selected from the group consisting of aluminum, titanium, zirconium, or mixtures thereof;
   (d) a di- or trialkoxysilane compound; and
   (e) a volatile dicarbonyl compound;
   with the proviso that the coating composition is free of polymers with hydroxyl groups, primary amine groups, and secondary amine groups.

2. The one-component, curable coating composition of claim 1, comprising:
   (a) about 50 wt % to about 99 wt % based on binder weight of combined weights of the polymer having a plurality of alkoxysilane groups and the polyepoxide having a plurality of epoxide groups connected through ester linkages, ether linkages, or a combination of ester linkages and ether linkages, wherein the ratio of epoxide groups to silane groups in the coating composition is in the range of from about 1:1 to about 1:10;
   (c) about 0.5 wt % to about 20 wt %, based on binder weight, of the chelated metal alkoxide; and
   (d) about 2 to about 9 percent by weight of the di- or trialkoxysilane compound.

3. The one-component, curable coating composition of claim 1, wherein the di- or trialkoxysilane compound is volatile.

4. The one-component, curable coating composition of claim 1, wherein the polymer having a plurality of alkoxysilane groups is an acrylic polymer, a polyurethane, or a polyester.

5. The one-component, curable coating composition of claim 1, wherein the polymer having a plurality of alkoxysilane groups further comprises acetoacetate functionality.

6. The one-component, curable coating composition of claim 1, further comprising
   (e) a compound or polymer having acetoacetate functionality that is different from polymer (a).

7. The one-component, curable coating composition of claim 6, comprising up to about 50 wt %, based on total binder weight, of the compound or polymer having acetoacetate functionality.

8. The one-component, curable coating composition of claim 1, wherein the di- or trialkoxysilane comprises vinyltrimethoxysilane.

9. The one-component, curable coating composition of claim 1, wherein the volatile dicarbonyl compound comprises a member selected from the group consisting of 2,4-pentanedione, methyl acetoacetate, ethyl acetoacetate, 3-methyl-2,4-pentandione, 2-acetylcyclopentanone, and combinations thereof.

10. The one-component, curable coating composition of claim 1, wherein the coating composition is a clearcoat coating composition.

11. A method of coating an article, the method comprising applying the one-component, curable coating composition of claim 1 onto a surface of the article.

12. The method of claim 11, wherein the curable coating composition is cured by reaction with water.

13. The method of claim 11, wherein the curable coating composition is applied to all of the surface of the article.

14. The method of claim 11, wherein the curable coating composition is applied to a part of the surface that is less than all of the surface of the article.

15. An article having thereon a coating prepared according to the method of claim 12.

* * * * *